United States Patent
Nobushima

(10) Patent No.: US 7,630,540 B2
(45) Date of Patent: Dec. 8, 2009

(54) IMAGE PROCESSING DEVICE AND PRINTER DRIVER CONVERTING MULTIVALUED PIXEL VALUES USING A COLOR CONVERSION LUT

(75) Inventor: Koichi Nobushima, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 678 days.

(21) Appl. No.: 11/270,776

(22) Filed: Nov. 10, 2005

(65) Prior Publication Data

US 2006/0103863 A1    May 18, 2006

(30) Foreign Application Priority Data

Nov. 12, 2004   (JP) ............................. P2004-329422

(51) Int. Cl.
*G06K 9/00*   (2006.01)
(52) U.S. Cl. ........................................ 382/162; 358/1.9
(58) Field of Classification Search ................. 358/1.9, 358/3.01, 3.23, 515, 518, 523, 525, 530; 347/15, 43, 171; 382/162, 164, 167; 345/589, 345/600–604
See application file for complete search history.

(56) References Cited

U.S. PATENT DOCUMENTS

| | | | | |
|---|---|---|---|---|
| 5,212,546 A | * | 5/1993 | Arazi et al. | 358/518 |
| 5,463,480 A | * | 10/1995 | MacDonald et al. | 358/520 |
| 5,764,387 A | * | 6/1998 | Yamada | 358/525 |
| 5,764,796 A | * | 6/1998 | Smith | 382/167 |
| 6,072,902 A | * | 6/2000 | Myers | 382/167 |
| 6,575,096 B1 | * | 6/2003 | Caruthers et al. | 101/491 |
| 6,903,747 B2 | * | 6/2005 | Kakutani | 345/600 |
| 7,016,530 B2 | * | 3/2006 | Saito et al. | 382/162 |
| 7,126,618 B2 | * | 10/2006 | Hirumi et al. | 347/171 |
| 7,420,707 B2 | * | 9/2008 | Agehama | 358/1.9 |
| 7,443,544 B2 | * | 10/2008 | Waksman | 358/3.23 |
| 2006/0103863 A1 | * | 5/2006 | Nobushima | 358/1.9 |

FOREIGN PATENT DOCUMENTS

JP    2002-086666    3/2002

* cited by examiner

*Primary Examiner*—Amir Alavi
(74) *Attorney, Agent, or Firm*—The Nath Law Group; Jerald L. Meyer; Stanley N. Protigal

(57) ABSTRACT

An image processing device has a color-space data storage section storing a*b*-plane division data concerning a dividing method of an a*b*-plane in a L*a*b* color space; a LUT storage section storing LUTs, each of which combines color zones, those into which the a*b*-plane is divided, and a printing order of ink colors used for multicolor-printing with a relationship between multivalued pixel values in an original color-space and those in an ink color-space; a controller obtaining a*b*-values of the ink colors from a printer; a LUT selector discriminating which of the color zones the obtained a*b*-values belong to, and selecting a LUT corresponding to a combination of the discriminated color zones and the printing order of the ink colors from the LUTs; a color converter converting multivalued pixel values of a multicolor original image in the original color-space into multivalued pixel values in the ink color-space, based on the selected LUT.

16 Claims, 7 Drawing Sheets

IMAGE PROCESSING DEVICE AND PRINTER DRIVER CONVERTING MULTIVALUED PIXEL VALUES USING A COLOR CONVERSION LUT

BACKGROUND OF THE INVENTION

1. Field of the Invention

The present invention relates to a printer driver and an image processing device, which are used in a printing machine such as a stencil printing machine, and more particular, a technique for selecting an appropriate color conversion look-up table (LUT) corresponding to ink colors used in separation printing.

2. Description of the Related Art

Polychromic printing by a multicolor printing machine such as a duotone stencil printing machine needs to carry out a so-called separation process to convert multivalued pixel values in original color spaces (e.g. a RGB color space) associated with colors of a full color original image into those in ink color spaces (e.g. a CMY color space) associated with ink colors used in multicolor printing.

There is a typical algorithm for separation printing that uses a color conversion LUT converting multivalued pixel values in the RGB color space into those in the CMY color space. The color conversion LUT is a comprehensive table including color conversion information such as color conversion, color correction/emphasis, and concentration correction. Corresponding to printing conditions such as a number of ink colors on use and their printing order, multiple kinds of color conversion LUTs are prepared. Note that the term "LUTs" means a plurality of look-up tables in this specification.

In this case, a user has to select a color conversion LUT, which is suitable for ink colors used in a multicolor printing machine and their printing order, from among the multiple kinds of color conversion LUTs. Therefore, in order to reduce a burden in the user's selecting, Japanese Patent Application Laid-Open No. 2002-86666 discloses a multicolor printing machine that detects an ink colors of printing drums by using ink-color detecting means (i.e. a combination of plural switches) and automatically performs a color conversion with reference to a ink-color combination table, based on the detected ink colors.

SUMMARY OF THE INVENTION

However, the use of such ink-color detecting means set up for each ink color leads us to the following issue: if a user changes some of ink colors on use with new ink colors, or adds new ink colors to the ink colors on use, the user has to provide new ink-color detecting means for detecting those new ink colors for the multicolor printing machine.

In order to achieve the above issue, the present invention has the aim of providing an image processing device and a printer driver, both of which perform color conversion by automatically selecting an appropriate color conversion LUT, which corresponds to ink colors used for printing drums and their printing order, from among a plurality of color conversion LUTs preliminarily stored in the image processing device or the printer driver, even if a user faces the above situations.

According to a first aspect of the present invention, there is provided an image processing device comprising: a color space data storage section storing chromaticity surface division data concerning a method of dividing a chromaticity surface for any brightness in a device independent color space; a color conversion LUT storage section storing a plurality of color conversion LUTs, each of which combines a plurality of color zones, those into which the chromaticity surface is divided, and a printing order of a plurality of ink colors used for multicolor-printing a multicolor original image with a compliance relationship between multivalued pixel values in an original color space associated with the multicolor original image and multivalued pixel values in an ink color space associated with the plurality of ink colors; a controller obtaining chromaticities of the plurality of ink colors from a printer; a color conversion LUT selector discriminating which of the plurality of color zones the obtained chromaticities belong to, and selecting a color conversion LUT corresponding to a combination of the discriminated color zones and the printing order of the plurality of ink colors from among the plurality of color conversion LUTs; a color converter converting multivalued pixel values of the multicolor original image in the original color space into multivalued pixel values in the ink color space, based on the selected color conversion LUT.

According to a second aspect of the present invention, there is also provided a printer driver of a printer for multicolor-printing a multicolor original image created by an application program, comprising: a color space data storage section storing chromaticity surface division data concerning a method of dividing a chromaticity surface for any brightness in a device independent color space; a color conversion LUT storage section storing a plurality of color conversion LUTs, each of which combines a plurality of color zones, those into which the chromaticity surface is divided, and a printing order of a plurality of ink colors used for multicolor-printing the multicolor original image with a compliance relationship between multivalued pixel values in an original color space associated with the multicolor original image and multivalued pixel values in an ink color space associated with the plurality of ink colors; a controller obtaining chromaticities of the plurality of ink colors from the printer; a color conversion LUT selector discriminating which of the plurality of color zones the obtained chromaticities belong to, and selecting a color conversion LUT corresponding to a combination of the discriminated color zones and the printing order of the plurality of ink colors from among the plurality of color conversion LUTs; a color converter converting multivalued pixel values of the multicolor original image in the original color space into multivalued pixel values in the ink color space, based on the selected color conversion LUT.

DETAILED DESCRIPTION OF THE PREFERRED EMBODIMENTS

Several embodiments of the present invention will be described below with reference to drawings.

First Embodiment

Figure 1:
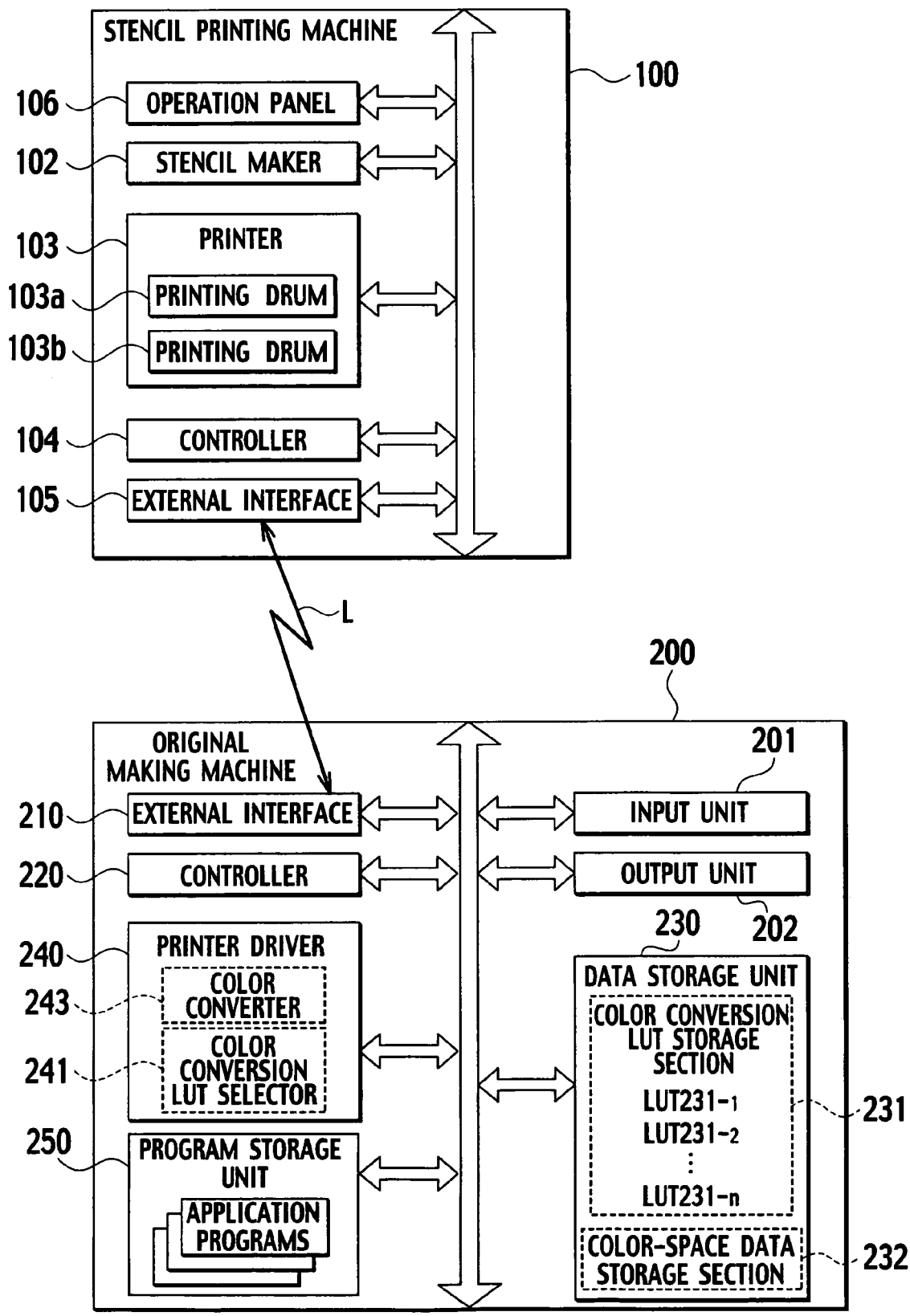
FIG. 1 is a block diagram showing a constitution of a printing system having a printer driver according to a first embodiment of the present invention.

FIG. 1 is a block diagram showing a system in which an original making device 200 having a printer driver according to the first embodiment of the present invention is connected to a stencil printing machine 100 through a network L. In this case, a user makes a multicolor original (image data: hereinafter called a "multicolor original image data") by using the original making machine 200 and subsequently transmits the multicolor original image data to the stencil printing machine 100 through the network L.

The stencil printing machine 100 is a multicolor printing machine that comprises a stencil maker 102, a printer 103, a controller 104, an external interface 105, and an operation panel 106. The printer 103 includes a first fitting unit (printing drum 103a) and a second fitting unit (printing drum 103b), both capable of fixing printing drums of different ink colors.

The controller 104 comprises a central processing unit (CPU), a random access memory (RAM), and a read only memory (ROM), all of which are not shown in the figure. The CPU controls the whole stencil printing machine 100 based on the result of processing programs and data read out from memory means (not shown) on the RAM.

The operation panel 106 includes an input section and a display section. The input section is formed by touch panels, switches, and others (not shown), to receive user's indications. The display section is formed by liquid crystal panels, lamps, and so on (not shown), to display various information against the user.

The external interface 105 has a function to allow the stencil printing machine 100 to connect with the original making machine 200 through the network L.

The printer 103 is equipped with two fitting positions (a first fitting position and a second fitting position) enabling two printing drums to be fitted to the printer 103. In printing, printing sheets are pressed on the printing drums fitted at the first and second fitting positions in this order. Then, ink supplied from the respective printing drums is transferred onto the printing sheets through perforations in stencil sheets attached to the printing drums. Hereinafter, a printing drum fitted at the first fitting position will be defined as the printing drum 103a, while another printing drum fitted at the second fitting position will be defined as the printing drum 103b.

The printing drums 103a and 103b are equipped with ink bottles for storing the inks, respectively. The controller 104 reads out information (L*a*b*-values) about ink colors from data tags pasted on the ink bottles through read-out means, and subsequently stores the information about ink colors on storing means, together with the other information.

Here the term "L*a*b*-value" is defined as a coordinate value of a color system, which is so-called "L*a*b* color space", represented by a set (L*, a*, b*) of three parameters L*, a*, and b*. The parameter L* represents a brightness, and the parameters a* and b* represent a chromaticity (that is, a hue and a saturation). The parameter L* has a numerical value within a range of 0 (dark) to 100 (bright); the parameter a* has a numerical value within a range of −100 (green) to 100 (red); and the parameter b* has a numerical value within a range of −100 (blue) to 100 (yellow). A coordinate of a color plane represented by the set (a*, b*) of the parameters a* and b* will be hereinafter called an "a*b*-value".

In addition, these L*a*b*-values are preliminarily measured by a color measuring device such as a spectroscopic color-difference meter. The measurement of the L*a*b*-values is performed by using a printing sheet to be actually used onto which color inks are applied under several conditions for actual printing such as an amount of the color inks, a printing pressure.

The original making machine 200 connected to the stencil printing machine 100 through the network L is embodied by a personal computer. The original making machine 200 comprises an external interface 210, a controller 220, a printer driver 240, a program storage unit 250 storing application programs, an input unit 201 (such as a keyboard and a mouse) for inputting information, an output unit 202 (such as a display unit) for displaying processed information and data and a data storage unit 230.

The external interface 210 has a function of connecting the original making machine 200 to the stencil printing machine 100 through the network L.

The controller 220 comprises a central processing unit (CPU), a random access memory (RAM), and a read only memory (ROM), all of which are not shown in the figure. The CPU controls the whole original making machine 200 based on the result of processing application programs and data read out from the program storage unit 250 on the RAM.

The data storage unit 230 includes a color conversion LUT storage section 231 storing multiple kinds of color conversion LUTs 231-1, 231-2, . . . , and 231-n used for the separation process and a color-space data storage section 232 storing chromaticity surface division data.

Here the term "chromaticity surface division data" means data representing how an a*b* color surface for any L*-value in the L*a*b* color space is divided into color zones. The method of dividing the a*b* color surface will be hereinafter called a "color division". It should be noted here that ink colors used in the stencil printing machine 100 always belong to any of the divided color zones.

In addition, the color division of the present invention is performed for only a*b* color plane because the any of L*-values have little influence on the tendency of the chromaticity. In this regard, it is preferred that the parameter (brightness) L* takes a value within a range of $35<L^*<90$. The reason is that a L*-value within a range of $L^*\geq 90$ or $L^*\leq 35$ make it harder to discriminate the parameters (chromaticity) a* and b* because it is too bright or too dark. Thus, the color division of an a*b* color plane for L*-values within this range: $35<L^*<90$ is sufficient to achieve the aim of the present invention. This allows not only an accurate color conversion to be realized, but also a memory size of the color-space data storage section 232 to be reduced because the color-space data storage section 232 just has to store only a*b*-values for a L*-value (that is, coordinate values (a*, b*) of an a*b* color plane) in the L*a*b* color space.

Each of the color conversion LUTs 231-1, 231-2, . . . , and 231-n stored in the color conversion LUT storage section 231 is a look-up table showing a compliance relationship between multivalued pixel values in the RGB color space and multivalued pixel values in an output color space (e.g. CMY color space), which corresponds to a combination of ink colors (i.e. divided color zones) used in the stencil printing machine 100 and their printing order. For instance, if two kinds of ink colors used in the stencil printing machine 100 (that is, the ink colors of the printing drums 103a and 103b) belong to different color zones of five color zones (red zone, blue zone, green zone, yellow zone, and black zone), twenty ($=_5C_2 \times 2$) kinds of color conversion LUTs 231-1 to 231-20 need to be preliminarily prepared and stored in the color conversion LUT storage section 231 with consideration of their printing order (that is, the order of the ink colors of the printing drums 103a and 103b).

The color-space data storage section 232 preliminarily stores data concerning the color division of an a*b* color plane for any L*-value in the L*a*b* color space. The data will be described later in detail.

The printer driver 240 includes a color converter 243 and a color conversion LUT selector 241. The color conversion LUT selector 241 obtains an L*a*b*-value of an ink color for the printing drums 103a fitted at the first fitting position of the stencil printing machine 100 and an L*a*b*-value of an ink color for the printing drums 103b fitted at the second fitting position of the stencil printing machine 100. The color conversion LUT selector 241 discriminates which color zone of the chromaticity surface division data stored in the color-space data storage section 232 the obtained a*b*-values belong to.

If the a*b*-values belong to different color zones, the color conversion LUT selector 241 selects a color conversion LUT for color conversion from among the color conversion LUTs stored in the color conversion LUT storage section 231. While, if they belong to a same color zone, then the color conversion LUT selector 241 outputs an indication (i.e. an error message) representing that it is impossible to automatically select the color conversion LUT, via the output unit 202.

Referring to the color conversion LUT selected by the color conversion LUT selector 241, the color converter 243 converts multivalued pixel values of the multicolor original image in the RGB color space associated with the multicolor original image data into multivalued pixel values of the output color space associated with an ink color for printing.

Figure 2:
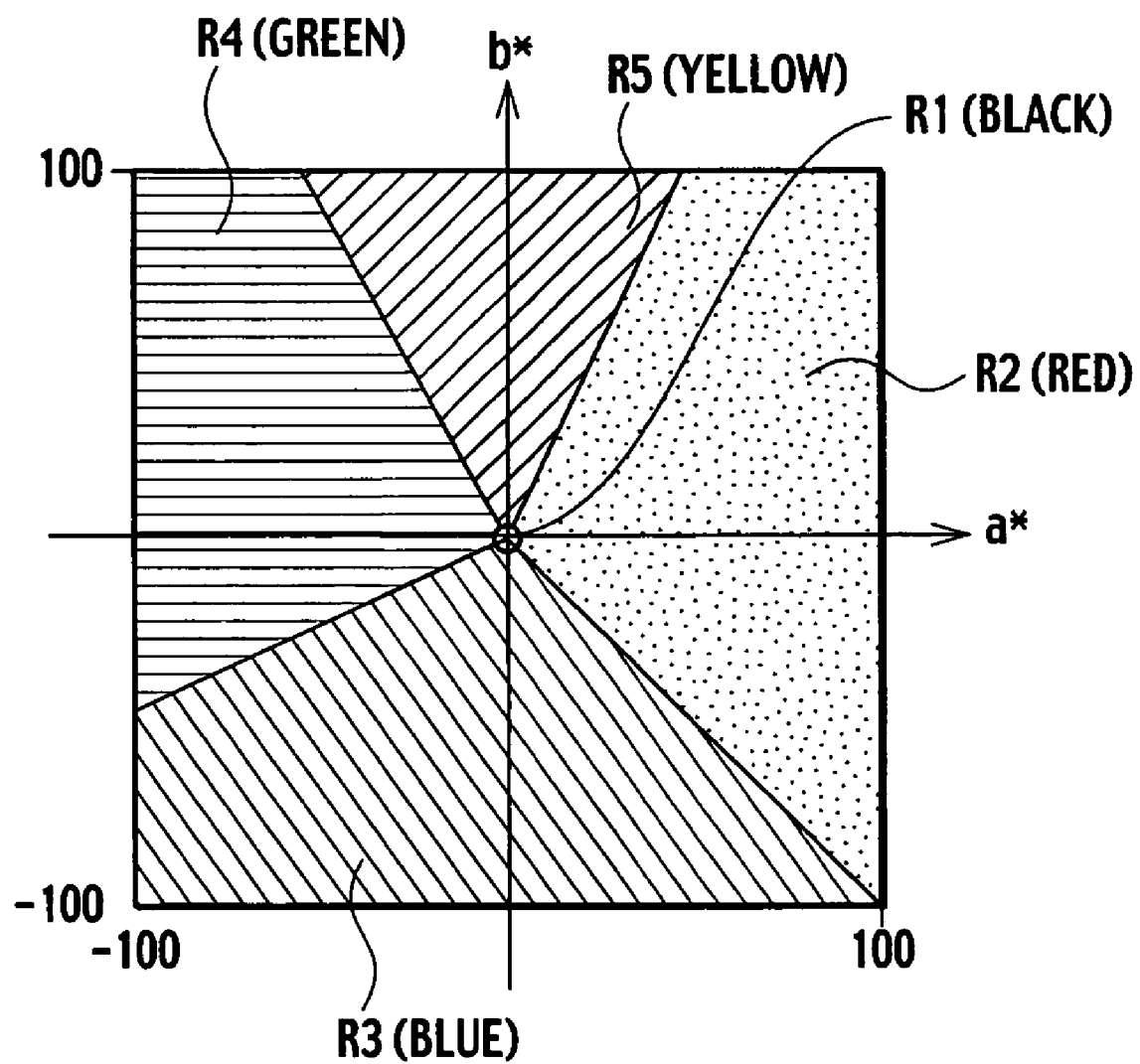
FIG. 2 is an explanatory picture showing an example of dividing an a*b* color plane into five color zones.

FIG. 2 is an explanatory picture showing a chromaticity surface division data stored in the color-space data storage section 232. In this figure, the horizontal axis (from red to green) denotes values of the parameter a* and the vertical axis (from yellow to blue) denotes values of the parameter b*. In this example, any a*b* color plane in the L*a*b* color space is divided into five color zones (i.e. red, blue, green, yellow, and black zones) as color zones to which ink colors for printing belong. Here the L*a*b* color space is a typical example of device independent color spaces. Although the present embodiment adopts the L*a*b* color space, any device independent color space (e.g. the XYZ color space and the L*C*h* color space) can be adopted for the color division of the present invention. Also, the method of dividing a*b* color plane for any L*-value is same as the color division shown in FIG. 2.

FIG. 2 shows the chromaticity surface division data representing how to divide an a*b* color plane for any L*-value into five color zones: red, blue, green, yellow, and black zones. Here the five zones are defined as follows:

(A) Black zone: the color zone R1 satisfying the condition: $(a^*)^2+(b^*)^2 \leq 6$;

(B) Red zone: the color zone R2 subtracting the black zone R1 from the color zone satisfying both of the conditions: (a) $a^* > 0$, $b^* > 0$, and $b^* \leq 2 \times a^*$, and (b) $a^* > 0$, $b^* \leq 0$, and $-b^* \leq a^*$;

(C) Blue zone: the color zone R3 subtracting the black zone R1 from the color zone satisfying both of the conditions: (c) $a^* > 0$; $b^* \leq 0$, and $-b^* > a^*$, and (d) $a^* \leq 0$, $b^* \leq 0$, and $b^* \leq 0.5 \times a^*$;

(D) Green zone: the color zone R4 subtracting the black zone R1 from the color zone satisfying the conditions: (e) $a^* \leq 0$, $b^* \leq 0$, and $b^* > 0.5 \times a^*$, and (f) $a^* \leq 0$, $b^* > 0$, and $b^* \leq -2 \times a^*$;

(E) yellow zone: the color zone R5 subtracting the black zone R1 for the color zone satisfying the conditions: (g) $a^* \leq 0$, $b^* > 0$, and $b^* > -2 \times a^*$, and (h) $a^* > 0$, $b^* > 0$, and $b^* > 2 \times a^*$.

It should be noted here that there are other methods for dividing an a*b* color plane in the L*a*b* color space. In general there is a trade-off relationship between the number of the color zones and that of the color conversion LUTs. In other words, the more we finely divide the a*b* color plane, the more we need to preliminarily prepare many color conversion LUTs. Such a trade-off relationship allows an optimum number of the color division to be derived under practical conditions (for example, limitations required for memory capacity, processing speed of CPU, accuracy of color conversion, and so on). Thus, such an optimum number is set up as the number of the color division. Of cause, it is also possible to divide the a*b* color plane with a user's manner. For example, the controller 104 makes the output unit 202 of the original making machine 200 display an a*b* color plane for any L*-value. Then, based on a user's operation, the controller 220 divides the a*b* color plane on the output unit 202 with a desired manner. Under such a situation, the controller 220 creates color conversion LUTs with consideration to the divided color zones and their printing order.

Figure 3:
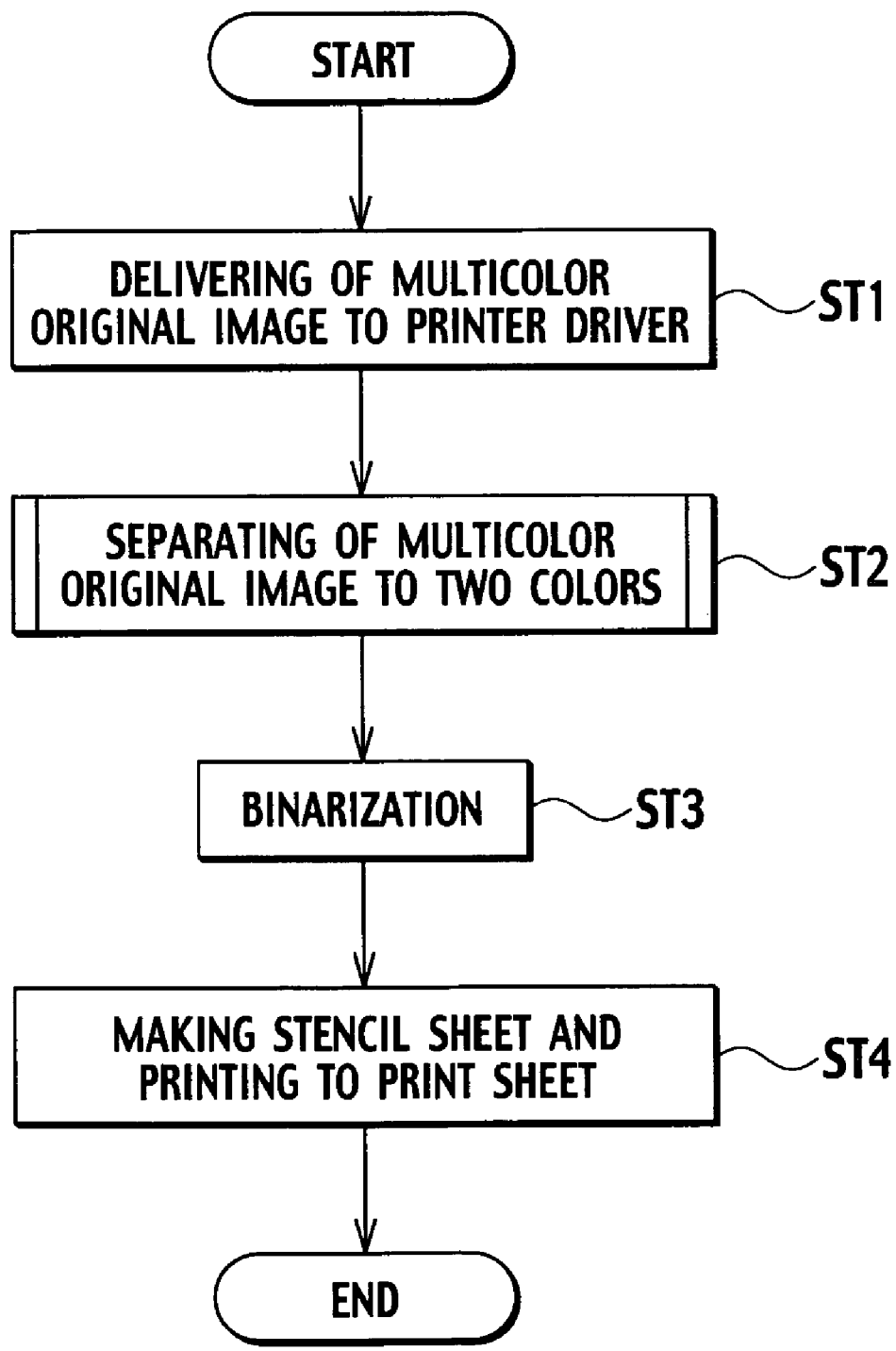
FIG. 3 is a flow chart showing a processing procedure of the printing system of the first embodiment.

An operating procedure of the above-constructed printing system of the present embodiment is described with reference to a flow chart of FIG. 3. FIG. 3 is a flow chart in case that the stencil printing machine 100 connected with the original making device 200 via the network L prints a multicolor original image data, which is made with an application program stored in the program storage unit 250.

When a user makes a multicolor original image data with the use of the application program stored in the program storage unit 250, the following operation is started.

In step ST1, the controller 220 delivers the multicolor original image data to the printer driver 240.

In step ST2, the printer driver 240 obtains ink colors (L*a*b*-values) of the printing drum 103a and 103b from the stencil printing machine 100, and separates the multicolor original image data on the basis of their a*b*-values, and then produces monochromatic original image data corresponding to the respective ink colors of the printing drums 103a and 103b.

In step ST3, the printer driver 240 digitalizes the monochromatic original image data separated into the ink colors of the printing drums 103a and 103b (i.e. producing of stencil data), and delivers the stencil data to the controller 220. Then, the controller 220 transmits the stencil data to the stencil printing machine 100 through the external interface 210 and the network L.

In step ST4, the stencil printing machine 100 receives the stencil data through the external interface 105. Further, the stencil maker 102 makes stencils for the printing drums 103a and 103b in accordance with the stencil data. In this step, it is also performed to swathe the printing drums 103a and 103b in the stencils corresponding to the ink colors of the printing drums 103a and 103b, and the printer 103 subsequently performs a printing operation.

Figure 4:
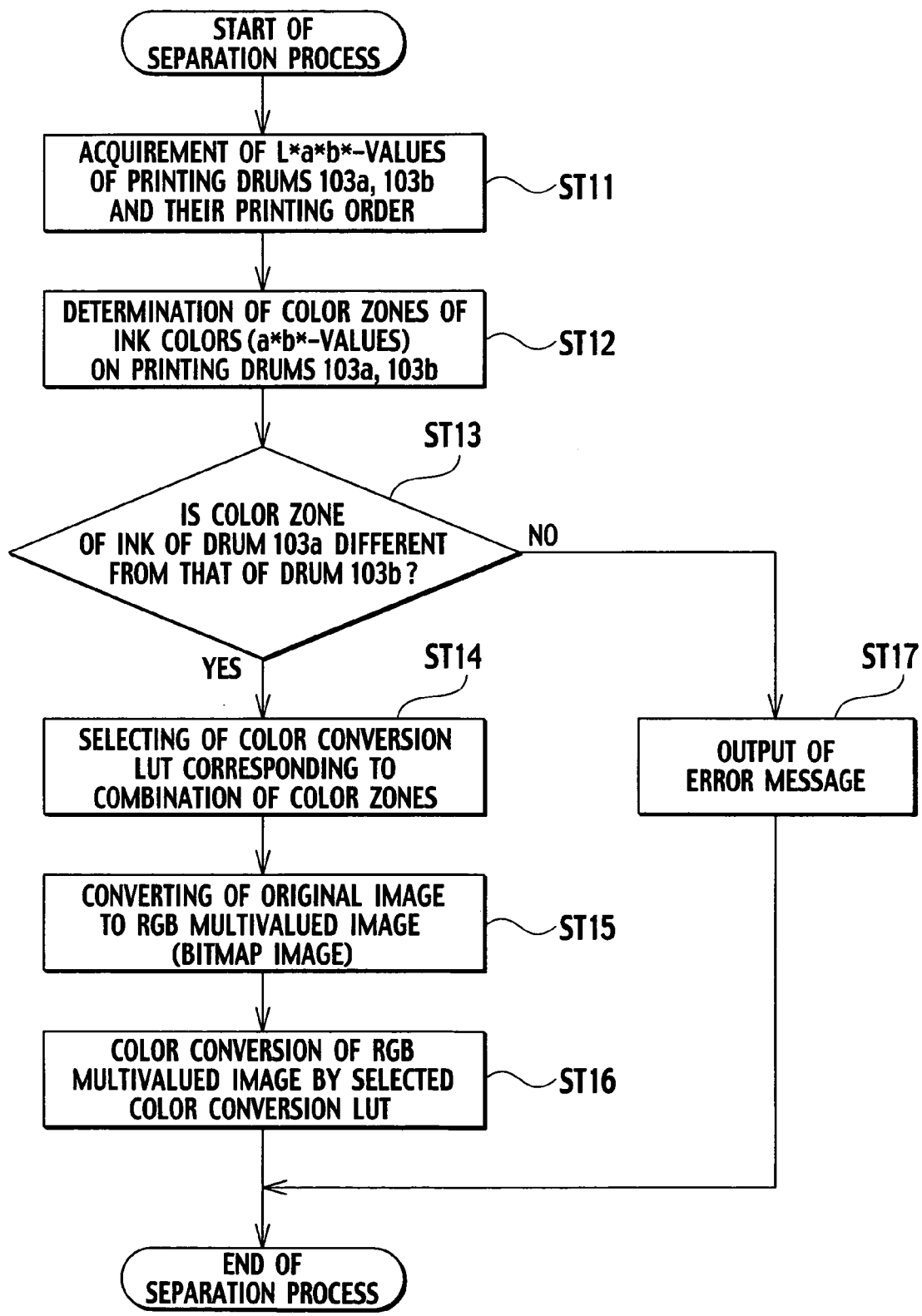
FIG. 4 is a flow chart showing a detailed procedure of a separation process in the flow chart of FIG. 3.

Next, a detailed procedure in step ST2 will be described with reference to a flow chart of FIG. 4.

A separation process is started after the process in step ST1 of FIG. 3.

In step ST11, the color conversion LUT selector 241 obtains the ink colors (i.e. a pairs of L*a*b*-values) of the printing drums 103a and 103b from the controller 104 of the stencil printing machine 100 through the external interface 210 and the network L.

Then, the controller 104 recognizes two printing drums fitted to the first and second fitting units of the printer 103 as the printing drums 103a and 103b, and reads out ink information of the printing drums 103a and 103b by storing means provided in the printing drums 103a and 103b. The ink information includes ink colors (i.e. $L^*a^*b^*$-values), residual quantities of inks. Additionally, as one example, the controller 104 stores the printing order of the first fitting unit and the second fitting unit in this order.

In step ST12, the color conversion LUT selector 241 refers to the color-space data storage section 232. Then, based on the $a^*b^*$-values of the obtained ink colors (the $L^*a^*b^*$-values), the color conversion LUT selector 241 determines which of the color zones in chromaticity surface division data the ink colors of the printing drums 103a and 103b belong to.

In ST13, the color conversion LUT selector 241 discriminates whether the determined color zone of the printing drum 103a is different from that of the printing drum 103b or not. If it is discriminated that the former is different from the latter, then the routine goes to step ST14. While, if it is discriminated that the former is not different from the latter, then the routine goes to step ST17.

In step ST14, the color conversion LUT selector 241 automatically selects a color conversion LUT used for color conversion from among the color conversion LUTs 231-1 to 231-n stored in the color conversion LUT storage section 231 in accordance with the combinations of the discriminated ink colors (color zones) and their printing order (i.e. the first fitting unit at first, and the second fitting unit secondly).

In step ST15, the color conversion LUT selector 241 converts the multicolor original image data delivered from the controller 220 to multivalued pixel values (bitmap image data) in the RGB color space. Thereafter, the color conversion LUT selector 241 delivers the converted multivalued pixel values to the color converter 243.

In step ST16, using the colo r conversion LUT selected at step ST14, the color converter 243 converts the multivalued pixel values in the RGB color space to multivalued pixel values in an output color space of the ink colors of the printing drums 103a and 103b. In this way, the separation process is completed.

On the other hand, if it is discriminated at step ST13 that the ink colors of the printing drums 103a and 103b belong to a same color zone, the color conversion LUT selector 241 displays an error message on the output unit 102, and subsequently, the separation process is ended. That is, if the ink colors of the printing drums 103a and 103b belong to a same color zone, both of the separated data (stencil data) are identical to each other, and consequently, respective printing images of the printing drums 103a and 103b are identical to each other, too. In such a case, the user is required to make an appropriate measure, for example, exchanging of the printing drums (ink colors), manual designation of the color conversion LUTs to be used, and so on.

Thus, according to the present embodiment, the printer driver 240 obtains $L^*a^*b^*$-values of the ink colors of the printing drums 103a and 103b, further determines which of the color zones in the chromaticity surface division data stored in the color-space data storage section 232 the obtained $a^*b^*$-values belong to, and furthermore selects the color conversion LUT corresponding to the combination of the determined color zones and their printing order from among the color conversion LUTs 231-1 to 231-n stored in the color conversion LUT storage section 231.

Accordingly, since the printer driver 240 automatically selects the color conversion LUT suitable for the combination of the ink colors of the printing drums used for multicolor-printing and their printing order and then carries out the separation process, it is possible for the printer driver 240 to provide printing images excellent in color-repeatability, and possible to reduce a user's burden in selecting a color conversion LUT, and also possible to provide a user with improved operationality.

In addition, even if the printing drums 103a and 103b are exchanged to other ones (i.e. alternation of ink colors), the exchanged ink colors always belong to any of color zones in the chromaticity surface division data stored in the color-space data storage section 232. Based on this fact, it is therefore possible to select the most appropriate color conversion LUT. Even if the number of user-owned printing drums (ink colors) is increased or decreased, there is such a same advantage. Thus, in such situations, the present embodiment has an advantage that there is no need to add new ink-color detecting means in comparison with the multicolor printing machine of the related art.

Furthermore, if the ink colors of the printing drums 103a and 103b belong to a same color zone of the chromaticity surface division data stored in the color-space data storage section 232, then the printer driver 240 provides a user with an error message through the output unit 202, allowing the user to take an appropriate measure.

Second Embodiment

Figure 5:
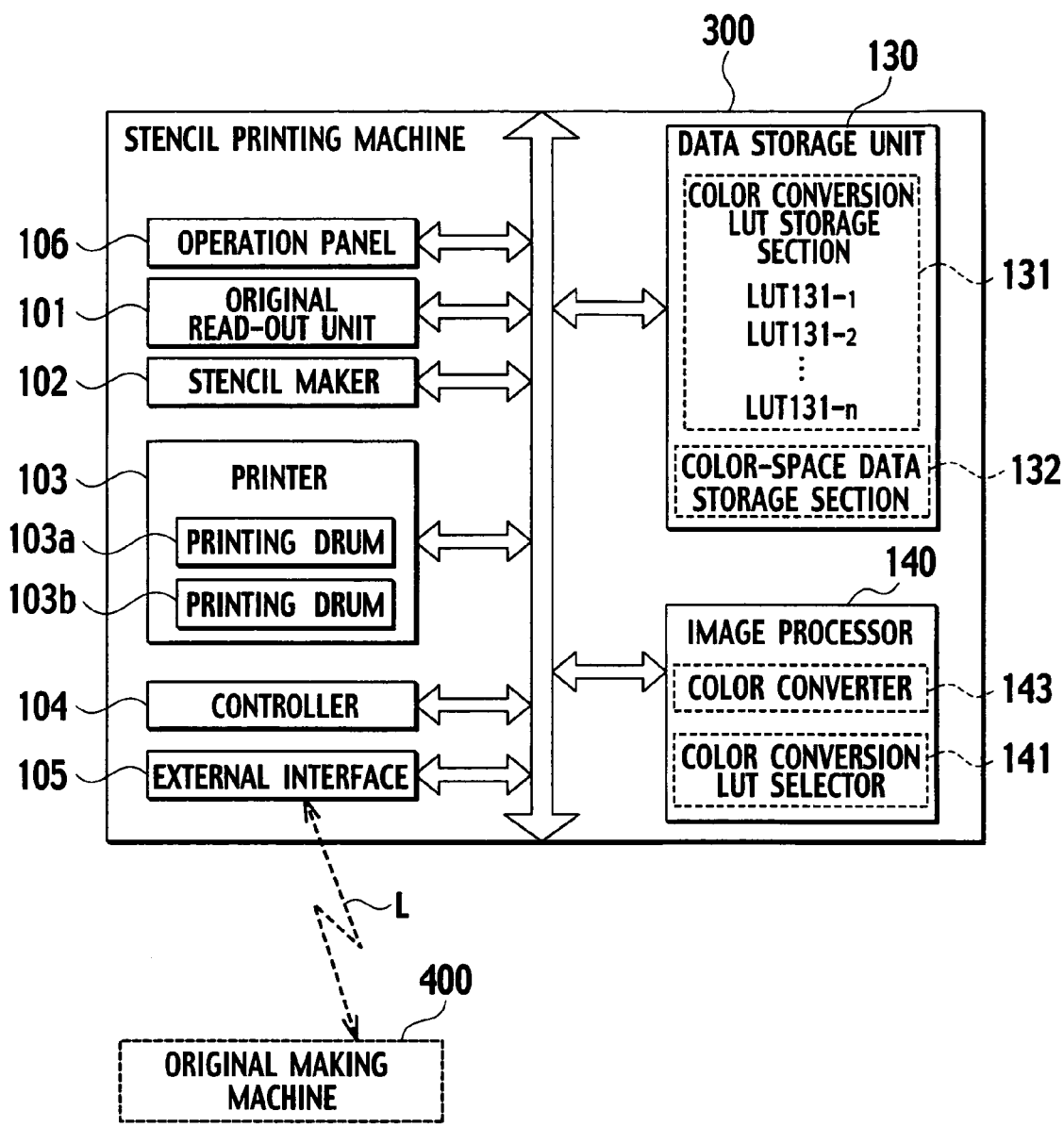
FIG. 5 is a block diagram showing a constitution of a printing system having an image processing device according to a second embodiment of the present invention.

FIG. 5 is a block diagram showing a printing system in which a stencil printing machine 300 having an image processor according to a second embodiment of the present invention is connected with an original making device 400 through a network L. In this case, a user makes a multicolor original image data by the original making machine 400. Then, the user either transmits the multicolor original image data to the stencil printing machine 300 through the network L for printing out or allows an original read-out unit 101 of the stencil printing machine to read out an image data of a multicolor original as the multicolor original image data for printing out. An example of the latter will be hereinafter described.

The stencil printing machine 300 is a multicolor printing machine that comprises the original read-out unit 101, the stencil maker 102, the printer 103, the controller 104, the external interface 105, the operation panel 106, a data storage unit 130, and an image processor 140. The printer 103 includes the first fitting unit (printing drum 103a) and the second fitting unit (printing drum 103b), both capable of fixing printing drums of different ink colors.

The stencil maker 102, the printer 103, the controller 104, the external interface 105, and the operation panel 106 of the stencil printing machine 300 are identical to those of the first embodiment respectively, and therefore descriptions about these constituents are eliminated.

The original read-out unit 101, which is formed by a scanner or the like, optically reads outs a multicolor original image to be printed out and outputs multivalued pixel values (bitmap image data) in a color space established in the scanner.

A data storage unit 130 includes a color conversion LUT storage section 131 and a color-space data storage section 132. The color conversion LUT storage section 131 and the color-space data storage section 132 are similar to the color conversion LUT storage section 231 and the color-space data storage section 232 of the first embodiment, respectively, and therefore descriptions about these sections are eliminated.

The image processor 140 includes a color conversion LUT selector 141 and a color converter 143. The color conversion LUT selector 141 and the color converter 143 are similar to the color conversion LUT selector 241 and the color converter 243, respectively, and therefore their detailed descriptions are eliminated.

Figure 6:
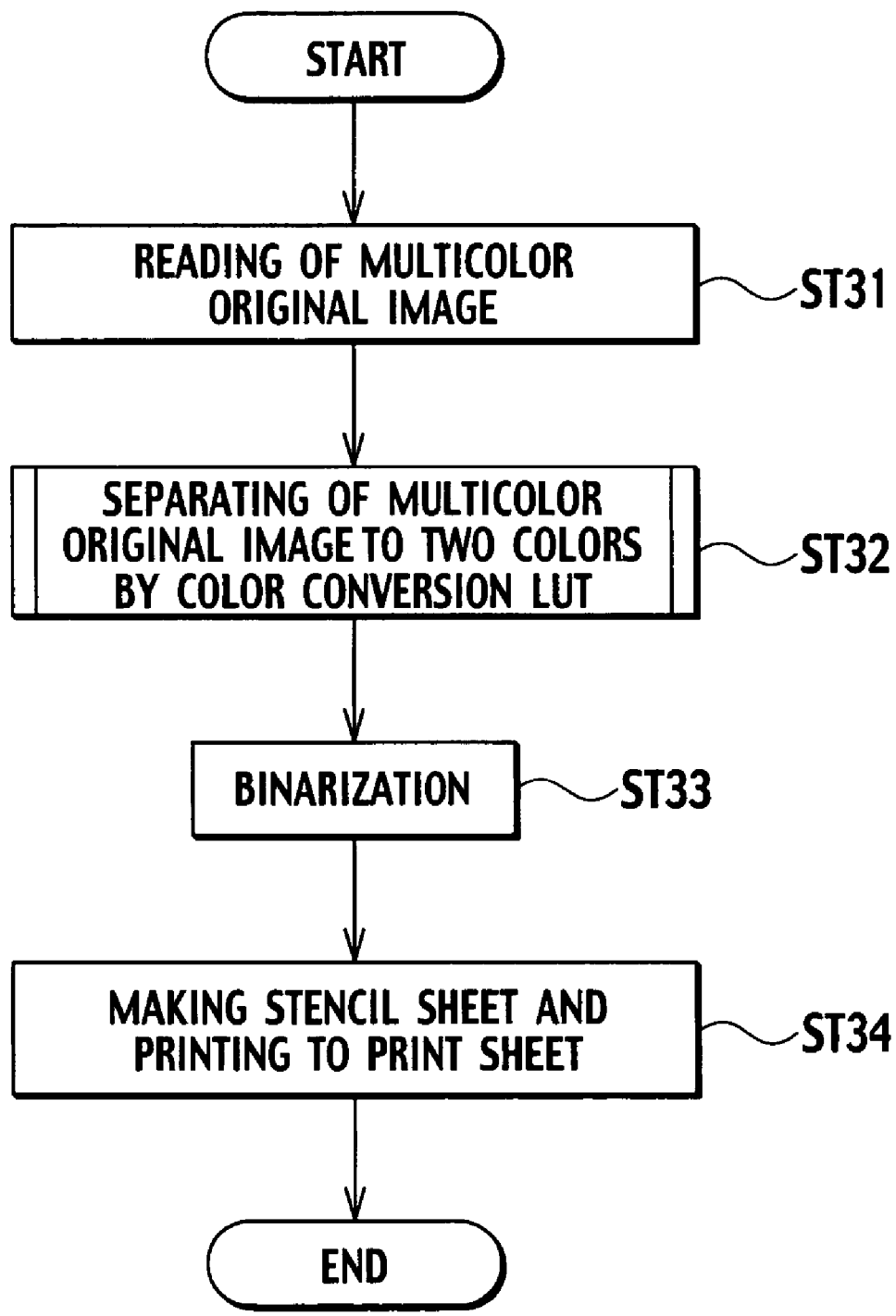
FIG. 6 is a flow chart showing a processing procedure of the printing system of the second embodiment.

Next, an operating procedure of the above-constructed printing system of the present embodiment will be described with reference to a flow chart of FIG. 6. FIG. 6 is a flow chart in case of printing a multicolor original on the basis of image data read out by the original read-out unit 101 of the stencil printing machine 300.

When a user sets up a multicolor original on the original read-out unit 101 and manipulates stencil making keys (not shown) of the operation panel 106, the following operation is started.

In step ST31, the controller 104 controls the original read-out unit 101 to read-out image data of a multicolor original image (i.e. multivalued pixel values in a color space of the original read-out unit 101) and delivers the read-out image data to the image processor 140.

In step ST32, the image processor 140 obtains ink colors (a pair of L*a*b*-values) of the printing drums 103a and 103b from the controller 104, and further separates the multicolor original image data on the basis of their a*b*-values, and furthermore produces monochromatic original image data corresponding to the ink colors of the printing drums 103a and 103b.

In step ST33, the image processor 140 digitalizes the monochromatic original image data separated into the ink colors of the printing drums 103a and 103b (producing of stencil data) and delivers the stencil data to the controller 102.

In this step ST34, the stencil maker 102 makes stencils in accordance with the stencil data. Then, it is further executed to swathe the printing drums 103a and 103b in stencil sheets produced in accordance with the ink colors of the printing drums 103a and 103b and a printing process is subsequently carried out by the printer 103.

Figure 7:
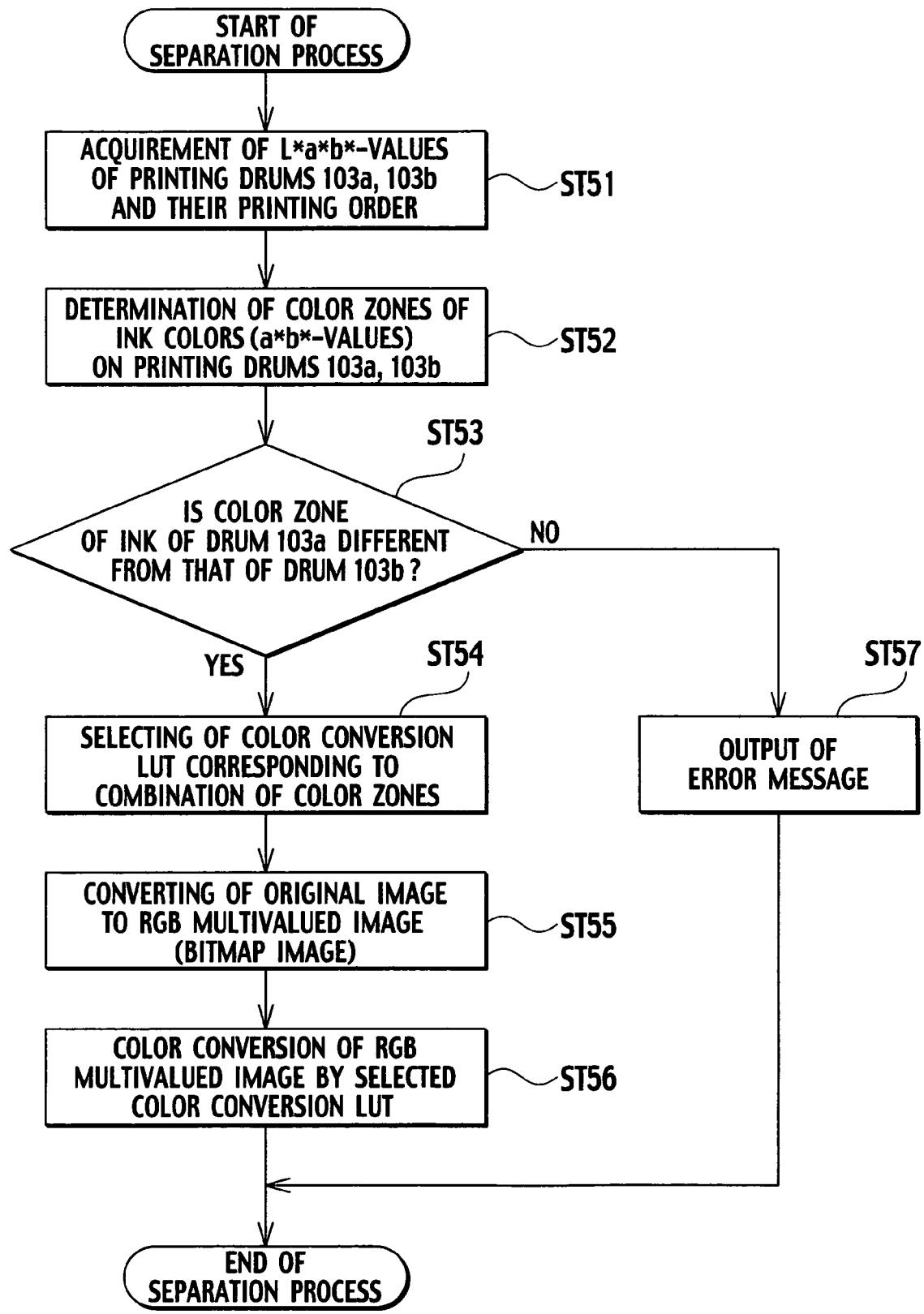
FIG. 7 is a flow chart showing a detailed procedure of a separation process in the flow chart of FIG. 6.

Next, a detailed procedure in step ST32 will be described with reference to a flow chart of FIG. 7.

A separation process is started after the process in step ST31 of FIG. 6.

In step ST51, the color conversion LUT selector 241 obtains ink colors (i.e. L*a*b*-values) of the printing drums 103a and 103b from the controller 104.

Then, the controller 104 recognizes the printing drums fitted to the first and second fitting units of the printer 103 as the printing drums 103a and 103b, and reads out ink information of the printing drums 103a and 103b by storing means provided in the printing drums 103a and 103b. The ink information includes ink colors (L*a*b*-values), residual quantities of inks. Further, the controller 104 recognizes the information about their printing order, that is, the first fitting unit at first and the second fitting unit secondly.

In step ST52, the color conversion LUT selector 141 refers to the color-space data storage unit 132. Based on the a*b*-values of the obtained ink colors (i.e. the L*a*b*-values), the color conversion LUT selector 141 determines which of the color zones in the chromaticity surface division data stored in the color-space data storage section 132 the ink colors of the printing drums 103a and 103b belong to.

In next ST53, the color conversion LUT selector 141 discriminates whether the determined color zone of the printing drum 103a is different from that of the printing drum 103b or not. If it is discriminated that the former is different from the latter, then the routine goes to step ST54. While, if it is discriminated that the former is not different from the latter, then the routine goes to step ST57.

In step ST54, the color conversion LUT selector 141 automatically selects a color conversion LUT used for color conversion from among the color conversion LUTs 231-1 to 231-n stored in the color conversion LUT storage section 131, corresponding to the combination of the discriminated ink colors (color zones) and their printing order (i.e. the first fitting unit at first, and the second fitting unit secondly).

In step ST55, the color conversion LUT selector 141 converts the multicolor original image data delivered from the controller 104 to multivalued pixel values (bitmap image data) in the RGB color space and further delivers the converted multivalued pixel values to the color converter 143.

In step ST56, using the selected color conversion LUT, the color converter 143 converts the multivalued pixel values in the RGB color space to multivalued pixel values in an output color space of the ink colors of the printing drums 103a and 103b. In this way, the separation process is completed.

On the other hand, if it is discriminated in step ST53 that the ink colors of the printing drums 103a and 103b belong to a same color zone, the color conversion LUT selector 141 displays an error message on a display unit (not shown) of the operation panel 106, and successively, the separation process is completed. Then, as in the case of the first embodiment, the user is required to make an appropriate measure, for example, exchanging of the printing drums (ink colors), manual designation of the color conversion LUTs to be used, and so on.

In this way, the image processor 140 of the present embodiment obtains L*a*b*-values of the ink colors of the printing drums 103a and 103b, and further determines which of the color zones in the chromaticity surface division data stored in the color-space data storage section 132 the obtained a*b*-values belong to, and furthermore selects the color conversion LUT corresponding to the combination of the determined color zones and their printing order from among the color conversion LUTs 231-1 to 231-n stored in the color conversion LUT storage part 131.

Accordingly, since the image processor 140 automatically selects the color conversion LUT suitable for a combination of the ink colors of the printing drums used for multicolor-printing and their printing order and carries out the separation process, it is possible for the image processor 140 to provide printing images excellent in color-repeatability, and possible to reduce a user's burden in selecting a color conversion LUT, and also possible to provide a user with improved operationality.

In addition, even if the printing drums 103a and 103b are exchanged to other ones (i.e. alternation of ink colors), the exchanged ink colors always belong to any of color zones in the chromaticity surface division data stored in the color-space data storage section 132. Based on this fact, it is therefore possible to select the most appropriate color conversion LUT. Even if the number of user-owned printing drums (ink colors) is increased or decreased, there is such a same advantage. Thus, in such situations, the present embodiment has an advantage that there is no need to add new ink-color detecting means in comparison with the multicolor printing machine of the related art.

Furthermore, if the ink colors of the printing drums 103a and 103b belong to a same color zone of the chromaticity surface division data stored in the color-space data storage section 132, then the image processor 140 provides a user with an error message through a not-shown display of the operation panel 106, allowing the user to take an appropriate measure.

Without being limited to the above-mentioned embodiments, the printer driver and the image processing device of the present invention may be modified by replacing their constituents with those having similar functions.

For instance, although the ink colors of the printing drums applicable to the printing part 103 are formed by the red zone, the blue zone, the green zone, the yellow zone, and the black zone in the above-mentioned embodiments, the ink colors may be formed by an optional number of color zones without being limited to these five zones only.

Additionally, although the above-mentioned embodiments commonly deal with a stencil printing machine in illustration of the printing machine, the present invention may be applicable to other printing machines without being limited to the stencil printing machine only.

The entire content of Japanese Patent Application No. P2004-329422 with a filing data of Nov. 12, 2004 is herein incorporated by reference.

What is claimed is:

1. An image processing device comprising:
    a color space data storage section storing chromaticity surface division data concerning a method of dividing a chromaticity surface for any brightness in a device independent color space;
    a color conversion LUT storage section storing a plurality of color conversion LUTs, each of which combines a plurality of color zones, those into which the chromaticity surface is divided, and a printing order of a plurality of ink colors used for multicolor-printing a multicolor original image with a compliance relationship between multivalued pixel values in an original color space associated with the multicolor original image and multivalued pixel values in an ink color space associated with the plurality of ink colors;
    a controller obtaining chromaticities of the plurality of ink colors from a printer;
    a color conversion LUT selector discriminating which of the plurality of color zones the obtained chromaticities belong to, and selecting a color conversion LUT corresponding to a combination of the discriminated color zones and the printing order of the plurality of ink colors from among the plurality of color conversion LUTs;
    a color converter converting multivalued pixel values of the multicolor original image in the original color space into multivalued pixel values in the ink color space, based on the selected color conversion LUT.

2. The image processing device according to claim 1, further comprising an output unit, wherein the controller allows the output unit to display error information when discriminating the plurality of ink colors belong to a same color zone.

3. The image processing device according to claim 1, wherein a number of the color zones obtained by dividing the chromaticity surface are alterable.

4. The image processing device according to claim 1, wherein the controller reads out the chomaticities of the plurality of ink colors from memory units set up on ink bottles mounted on a plurality of ink drums of the printer, respectively.

5. The image processing device according to claim 1, wherein the device independent color space is L*a*b* color space, and the controller read out a*b*-values of the plurality of ink colors as the chomaticities of the plurality of ink colors, respectively.

6. A computer program product providing a printer driver of a printer for multicolor-printing a multicolor original image created by an application program, comprising:

a color space data storage section storing chromaticity surface division data concerning a method of dividing a chromaticity surface for any brightness in a device independent color space;

a color conversion LUT storage section storing a plurality of color conversion LUTs, each of which combines a plurality of color zones, those into which the chromaticity surface is divided, and a printing order of a plurality of ink colors used for multicolor-printing the multicolor original image with a compliance relationship between multivalued pixel values in an original color space associated with the multicolor original image and multivalued pixel values in an ink color space associated with the plurality of ink colors; and a computer-readable medium comprising:

a first instruction for causing the computer to provide a controller function to obtain chromaticities of the plurality of ink colors from the printer; and a second instruction for causing the computer to provide a color conversion LUT selector discriminating which of the plurality of color zones the obtained chromaticities belong to, and selecting a color conversion LUT corresponding to a combination of the discriminated color zones and the printing order of the plurality of ink colors from among the plurality of color conversion LUTs; and a third instruction for causing the computer to provide a color converter function to convert multivalued pixel values of the multicolor original image in the original color space into multivalued pixel values in the ink color space, based on the selected color conversion LUT.

7. An image processing device comprising:

a computer program product providing a printer driver of a printer for multicolor-printing a multicolor original image created by an application program, comprising:

a color space data storage section storing chromaticity surface division data concerning a method of dividing a chromaticity surface for any brightness in a device independent color space;

a color conversion LUT storage section storing a plurality of color conversion LUTs, each of which combines a plurality of color zones, those into which the chromaticity surface is divided, and a printing order of a plurality of ink colors used for multicolor-printing the multicolor original image with a compliance relationship between multivalued pixel values in an original color space associated with the multicolor original image and multivalued pixel values in an ink color space associated with the plurality of ink colors;

a computer-readable medium comprising:

a first instruction for causing the computer to provide a controller function to obtain chromaticities of the plurality of ink colors from the printer; and a second instruction for causing the computer to provide a color conversion LUT selector discriminating which of the plurality of color zones the obtained chromaticities belong to, and selecting a color conversion LUT corresponding to a combination of the discriminated color zones and the printing order of the plurality of ink colors from among the plurality of color conversion LUTs; and a third instruction for causing the computer to provide a color converter function to convert multivalued pixel values of the multicolor original image in the original color space into multivalued pixel values in the ink color space, based on the selected color conversion LUT; and an output unit, wherein the controller allows the output unit to display error information when discriminating the plurality of ink colors belong to a same color zone.

8. The computer program product according to claim 6, wherein a number of the color zones obtained by dividing the chromaticity surface are alterable.

9. The computer program product according to claim 6, wherein the controller reads out the chomaticities of the plurality of ink colors from memory units set up on ink bottles mounted on a plurality of ink drums of the printer, respectively.

10. The computer program product according to claim 6, wherein the device independent color space is L*a*b* color space, and the controller read out a*b*-values of the plurality of ink colors as the chomaticities of the plurality of ink colors, respectively.

11. An image processing method comprising:

using a processor to perform the steps of:

storing chromaticity surface division data concerning a method of dividing a chromaticity surface for any brightness in a device independent color space;

storing a plurality of color conversion LUTs in a color conversion LUT, each of which color conversion LUTs combines a plurality of color zones, those into which the chromaticity surface is divided, and a printing order of a plurality of ink colors used for multicolor-printing a multicolor original image with a compliance relationship between multivalued pixel values in an original color space associated with the multicolor original image and multivalued pixel values in an ink color space associated with the plurality of ink colors;

obtaining chromaticities of the plurality of ink colors from a printer;

discriminating which of the plurality of color zones the obtained chromaticities belong to, and selecting a color conversion LUT corresponding to a combination of the discriminated color zones and the printing order of the plurality of ink colors from among the plurality of color conversion LUTs;

converting multivalued pixel values of the multicolor original image in the original color space into multivalued pixel values in the ink color space, based on the selected color conversion LUT.

12. The method of claim 11, wherein the controller allows the output unit to display error information when discriminating the plurality of ink colors belong to a same color zone.

13. The method of claim 11, wherein a number of the color zones obtained by dividing the chromaticity surface are alterable.

14. The method of claim 11, wherein the controller reads out the chomaticities of the plurality of ink colors from memory units mounted on a plurality of ink drums of the printer, respectively.

15. The method of claim 11, further comprising using the processor to perform the step of providing the device independent color space as a L*a*b* color space, and the controller reading out a*b*-values of the plurality of ink colors as the chomaticities of the plurality of ink colors, respectively.

16. The computer program product according to claim 6, wherein the controller allows an output unit of the printer to display error information when discriminating the plurality of ink colors belong to a same color zone.

* * * * *